United States Patent [19]

Silberman

[11] Patent Number: 4,991,543

[45] Date of Patent: Feb. 12, 1991

[54] ANIMAL SQUEEZER CAGE CONVERTER

[76] Inventor: Mark Silberman, 4570 Bissonnet, Bellaire, Tex. 77401

[21] Appl. No.: 339,606

[22] Filed: Apr. 17, 1989

[51] Int. Cl.⁵ .................. A61D 3/00; A01K 15/04
[52] U.S. Cl. .................................. 119/17; 119/96
[58] Field of Search ............... 119/17, 96, 98, 99, 119/151; 43/85

[56] References Cited

U.S. PATENT DOCUMENTS

| | | | |
|---|---|---|---|
| 1,667,998 | 3/1927 | Woodworth | 119/17 X |
| 3,399,654 | 9/1968 | Schroer | 119/17 X |
| 3,760,768 | 9/1973 | Patterson | 119/17 |

FOREIGN PATENT DOCUMENTS

| | | | |
|---|---|---|---|
| 2157008 | 5/1973 | Fed. Rep. of Germany | 119/17 |
| 2716451 | 10/1978 | Fed. Rep. of Germany | 119/96 |
| 2250510 | 6/1975 | France | 119/96 |

Primary Examiner—Robert P. Swiatek
Assistant Examiner—T. Manahan
Attorney, Agent, or Firm—Richard L. Miller

[57] ABSTRACT

An animal squeezer cage converter for a cage is provided and consists of an inner push rack which fits into and can slide towards and away from rear wall of the cage and an outer cage door frame which hinges and locks into place on the cage. The push rack can be releasably attached to rear of the cage door frame while there is a mechanism for adjustably locking and releasing the push rack between the cage door frame and the rear wall of the cage to restrain an animal therein.

3 Claims, 1 Drawing Sheet

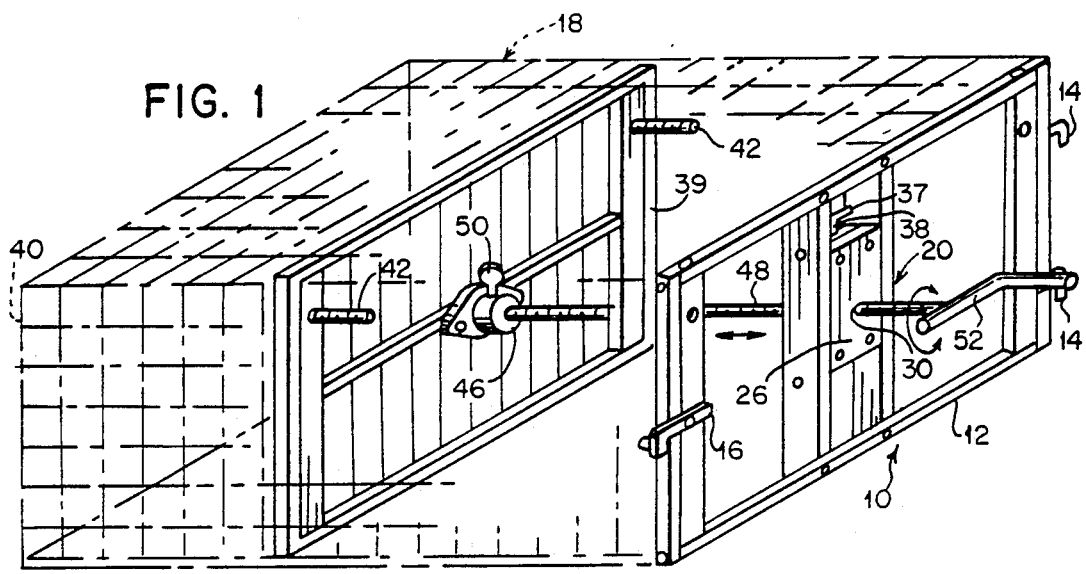
FIG. 1
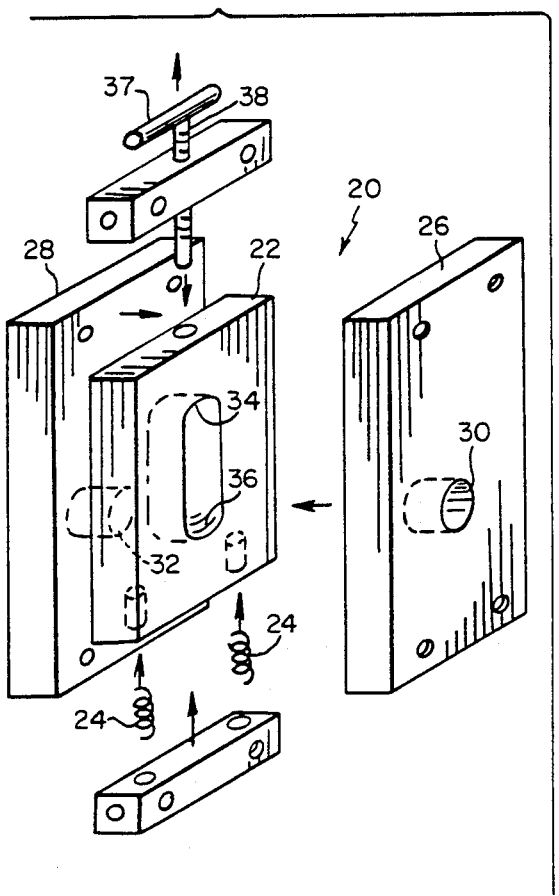
FIG. 2
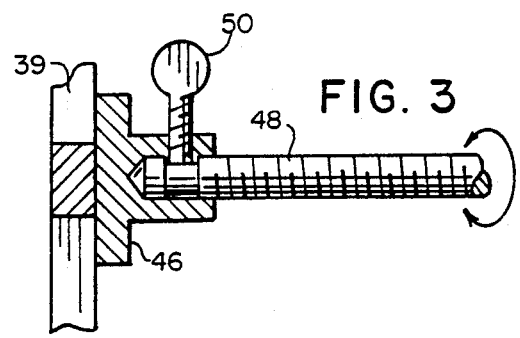
FIG. 3
FIG. 4

ANIMAL SQUEEZER CAGE CONVERTER

BACKGROUND OF THE INVENTION

The instant invention relates generally to animal pens and more specifically it relates to an animal squeezer cage converter.

Numerous animal pens have been provided in the prior art that are adapted to confine and restrain the animals therein. For example, U.S. Pat. Nos. 1,897,441 to Robertson; 2,616,392 to Hutchings; and 4,228,765 to Berlin all are illustrative of such prior art. While these units may be suitable for the particular purpose to which they address, they would not be as suitable for the purpose of the present invention as hereafter described.

SUMMARY OF THE INVENTION

A primary object of the present invention is to provide an animal squeezer cage converter that will overcome the shortcomings of the prior art devices.

Another object is to provide an animal squeezer cage converter which will take a normal animal cage and convert it into a squeezer cage for allowing treatment of hard to handle animals.

An additional object is to provide an animal squeezer cage converter that can be used as a conventional cage with a door by leaving the animal in place after use such that food and water can be placed into the cage without removing the converter.

Still another object is to provide an animal squeezer cage converter that will confine an animal in such a manner that a veterinarian can administer an injection between the bars of the cage to the animal so confined with little difficulty.

A further object is to provide an animal squeezer cage converter that is simple and easy to use.

A still further object is to provide an animal squeezer cage converter that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a fragmentary diagrammatic perspective view of the instant invention;

FIG. 2 is a fragmentary, enlarged and partially exploded perspective view of the locking and release mechanism shown removed therefrom;

FIG. 3 is a fragmentary enlarged side elevational view illustrating part of the mechanism in greater detail; and FIG. 4 is a fragmentary side elevational view of some of the mechanism for securing the movable wall to the front of the cage.

DETAILED DESCRIPTION OF THE PREFERRED EMBODIMENTS

Turning now descriptively to the drawings, in which like reference characters denote like elements throughout the several views, FIG. 1 illustrates an animal squeezer cage converter 10 that includes an outer piece or cage door frame 12 which hinges at 14 and locks at 16 into place on a cage 18 where an ordinary cage door would hinge and lock. The cage door frame 12 supports a locking and release mechanism 20. As best shown in FIG. 2, the mechanism 20 contains a slide member 22 which is biased by springs 24 within. A front plate 26 and rear plate 28 each have an unthreaded aperture 30 and 32 respectively therethrough. The slide member 22 has slotted aperture 34 therethrough with lower part 36 being threaded. A push handle 37 with threaded shaft 38 located above the slide member is also provided for releasing the rod from he threaded portion of the slotted aperture.

An inner piece or push rack 39 fits into and can slide towards or away from the rear wall 40 of the cage 18. The push rack 39 attaches to rear of the cage frame 12 by fasteners post 42 which are typically threaded and captivating devices typically wing nuts 44 (see FIG. 4), that can be unconnected and reconnected as rack 39 is used. There is a flush mounted bearing 46 (see FIG. 3) attached to the center of rack 39 to which a rotatable threaded elongated rod 48 has a crank handle 52 on other end.

To operate the converter 10 after placing an animal in the cage 18 the veterinarian simply closes cage door frame 12 with push rack 39 and locks the door closed with lock 16. Then he/she inserts the threaded elongated rod 48 through the mechanism 20 by pushing downward on the handle 37 allowing the slide member 22 to slide downwardly compressing the springs 24. The rod 48 is passed through the unthreaded aperture 30 in the front plate 26 and the upper part of the slotted aperture 34 in the slide member 22 bypassing the threaded portion 36. Once through the unthreaded aperture 32 in the rear plate 28, the rod 48 is inserted into the flush mounted bearing 46 and secured by turning the thumb screw 50. The veterinarian now releases the fasteners 42 and now once again pushes down on handle 37 of the mechanism 20, and then pushes the rod 48 with the push rack 39 attached, towards the rear wall 40 of the cage 18. Once satisfied with distance, the handle 37 is released. Now the threaded portion 36 of the slide member 22 will contact the threaded rod 48 and by turning the rod the Veterinarian can loosen or tighten the push rack 39 carefully against the animal. For a quick release (typically after treating the animal in some way) handle 37 is simply helded downwardly and rod 48 along with push rack 39 are then pulled away from rear wall 40 of the cage 18.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An animal squeezer cage converter used with and comprising:
    (a) an inner push rack which fits into and can slide towards and away from rear wall of the cage;

(b) an outer cage door frame which hinges and locks into place on the cage;
(c) means for releasably attaching said push rack to the rear of said cage door frame; and
(d) means for adjustably locking and releasing said push rack between said cage door frame and rear wall of the cage to restrain an animal therein, wherein said releasably attaching means includes a plurality of post fasteners which extend through said push rack and said cage door frame and a plurality of captivating devices that can be unconnected and reconnected as said push rack is used.

2. An animal squeezer cage converter as recited in claim 1, wherein said adjustably locking and releasing means comprises:
   (a) a pair of spaced apart plates, each having an unthreaded aperture therethrough;
   (b) a slide member having a slotted aperture therethrough with lower part of said slotted aperture threaded, said slide member carried between said plates;
   (c) a pair of springs carried below said slide member to bias said slide member upwardly;
   (d) a rotatable threaded elongated rod having a crank handle on one end, said rod fits through said unthreaded apertures in said plates and said slotted aperture in said slide member therebetween;
   (e) a flush mounted bearing attached to center of said push rack to which other end of said rod can rotatively fit into; and
   (f) a thumb screw transversely threaded into said bearing so that said rod can be rotatively attached and detached thereto, whereby said rod can loosen and tighten said push rack against an animal confined within said cage.

3. An animal squeezer cage converter as recited in claim 2, wherein said adjustably locking and releasing means further includes a push handle with threaded shaft carried above said slide member to push said slide member downwardly so as to release said rod from said lower threaded part of said slotted aperture for quickly releasing said push rack from the animal.

* * * * *